United States Patent
Janssen et al.

[11] 3,867,725
[45] Feb. 18, 1975

[54] ROTATING HEAD APPARATUS INCLUDING A THRUST GAS BEARING

[75] Inventors: Donovan M. Janssen, Boulder, Colo.; David Stedman, Morgan Hill, Calif.

[73] Assignee: International Business Machines Corporation, Armonk, N.Y.

[22] Filed: Oct. 1, 1973

[21] Appl. No.: 402,562

[52] U.S. Cl. ............... 360/102, 360/84, 360/107
[51] Int. Cl. ............... G11b 5/52, G11b 5/60
[58] Field of Search ............ 360/102, 103, 107, 84, 360/108; 178/6.6 A

[56] References Cited
UNITED STATES PATENTS

| | | | |
|---|---|---|---|
| 3,081,682 | 3/1963 | Khoury | 95/45 |
| 3,123,677 | 3/1964 | Lauxen et al. | 360/103 |
| 3,124,660 | 3/1964 | Criner | 360/103 |
| 3,166,997 | 1/1965 | Barcia et al. | 360/102 |
| 3,177,493 | 4/1965 | Durlofsky | 360/102 |
| 3,823,415 | 7/1974 | Fisher et al. | 360/102 |

Primary Examiner—Alfred H. Eddleman
Attorney, Agent, or Firm—Joscelyn G. Cockburn

[57] ABSTRACT

Two spacially cooperating rotary transformer windings are supported with accurate mechanical separation by a thrust gas bearing having a fixed position hydrostatic gas bearing member and a movable piston which integrally carries a movable hydrostatic gas bearing member. One transformer winding is carried by the fixed bearing member. The other cooperating transformer winding is supported by a headwheel. This headwheel is air bearing supported by the opposing forces supplied by the fixed and the movable bearing members, respectively. Dimensional manufacturing and operating tolerance is accomodated by movement of the piston, to thereby accurately maintain a desired mechanical spacing between the two transformer windings.

4 Claims, 5 Drawing Figures

PATENTED FEB 18 1975 3,867,725

ROTATING HEAD APPARATUS INCLUDING A THRUST GAS BEARING

BACKGROUND AND SUMMARY OF THE INVENTION

Prior art thrust gas bearings generally include at least two fixed position hydrostatic gas bearing surfaces which supply opposing forces to a compliantly movable member, to thus air bearing support this member. In these bearings, tolerance of the mechanical parts must be accurately maintained in order to achieve a desired mechanical spacing with acceptable variation.

The present invention achieves accurate mechanical spacing between one fixed position hydrostatic gas bearing surface and a supported member by the provision of a movable piston which carries a second hydrostatic gas bearing surface whose force opposes the force supplied by the fixed position bearing surface. This piston cooperates with a preessurized plenum and its bearing surface is supplied with gas from this plenum.

With this construction, the expected manufacturing and operational tolerance variations result in movement of the piston such that the supported member is supported adjacent the fixed position bearing surface with minimum variation in spacing due to these tolerance variations.

The rotating magnetic head apparatus of the present invention includes a transducer in the form of a rotating transformer whose stationary winding is carried by the fixed position bearing surface and whose head wheel constitutes the above-mentioned supported member which carries the moving transformer winding which cooperates with the stationary winding.

The foregoing and other features and advantages of the invention will be apparent from the following more particular description of the preferred embodiment of the invention, as illustrated in the accompanying drawing.

DESCRIPTION OF THE PREFERRED EMBODIMENT

Figure 1:
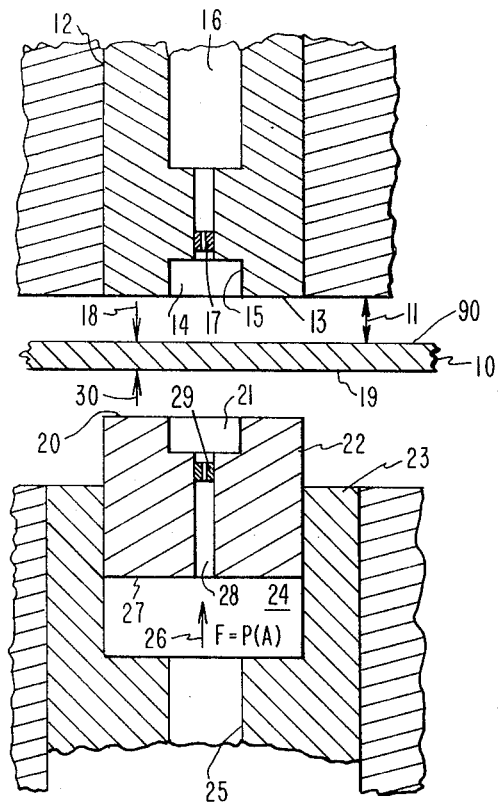
FIG. 1 shows a prior art thrust gas bearing and is useful in explaining the present invention.

FIG. 1 shows a prior art thrust gas bearing for example as shown in U.S. Pat. No. 3,166,997 issued to C. L. Barcia et al., and is useful in explaining the present invention. This gas bearing is effective to accurately support and postion compliantly movable member 10 wth an accurate spacing 11 from a first hydrostatic gas bearing surface or interface 13 defined by member 12. Member 12 is rigidly fixed in position and includes surface 13 which carries a number of blowing gas bearing openings, one of which is identified by reference numeral 14. This opening 14 is shown as a pool type bearing. However, the hydrostatic bearings may be of the porous type or of the hole type. Pool 15 is supplied with gas, for example air or other inert gas, under pressure, from a source not shown, by way of conduit 16 and orifice 17.

The designer of a hydrostatic gas bearing is normally presented with the dimension 11 which is to be accurately maintained between supported member 10 and bearing surface 13. The mass of member 10 must be considered only if the orientation of the apparatus is such that the gravity effect on this mass produces a load which must be supported. With these known constraints, the hydrostatic bearing is designed taking into account the orifice diameter, the pool diameter and depth and the supply pressure. Design considerations of this type are well known to those of skill in the art and reference can be had to numerous publications for assistance in these design considerations. Two such publications are *Gas Film Lubrication* by W.A. Gross, John Wiley and Sons, Inc., 1962; and *Design of Gas Bearings*, particularly Volume 1 thereof, published by the Rensselaer Polytechnic Institute and Mechanical Technology Incorporated, 1967.

Figure 3:
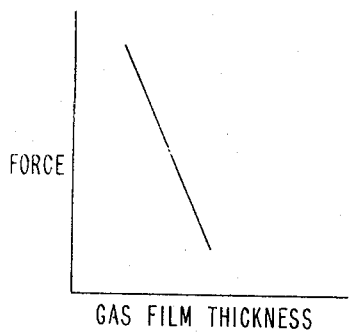
FIG. 3 is a graph which depicts the stiffness characteristic of a hydrostatic gas bearing.

The above-described fixed position hydrostatic bearing means provides a force 18 against the adjacent surface of member 10 as this member is spaced a distance 11 from bearing 13. Force 18 varies in a known manner with variation in distance 11. This relationship is known as the bearing stiffness, an example of which is shown in FIG. 3. Preferably, the bearings of FIG. 1 are stiff bearings. That is, a small variation in the gas film thickness produces a relatively large change in the bearings's supporting force.

The opposite face 19 of member 10 cooperates with a second hydrostatic gas bearing means or surface 20. This hydrostatic bearing includes pool 21 formed in movable piston 22. This piston is carried by stationary member 23. Member 23 and piston 22 define a cavity or plenum 24 which is supplied with a gas under presure from a source, not shown, by way of conduit 25. The gas contained within plenum 24 provides a force 26 which operates against the surface 27 of piston 22. Additionally, this source of gas supplies bearing surface 20 by way of conduit 28 and orifice 29.

It is important to note that, with the system in equilibrium, force 26, operating on movable piston 22, is identical in magnitude to forces 18 and 30 which establish the two bearing interfaces for member 10.

The pressure sources supplying conduits 16 and 25 are preferably regulated sources, and in addition, fine pressure-control adjustment, not shown, can be supplied in conduits 16 and 25.

The force operating against piston surface 27 is equal to the constant pressure within cavity 24 multiplied by the area of surface 27. Force 26 is a constant and does not change with a change in the position of piston 22. The pressure within cavity 24 is operable, in accordance with the above-mentioned well known hydrostatic bearing design techniques, to provide a force 30 on member 10, this force opposing force 18.

As shown in FIG. 3, the magnitudes of forces 18 and 30 are sensitive to the special relationship between the respective gas bearing surfaces 13 and 20 and the adjacent surface of member 10. Since these two bearings are relatively stiff, a relatively small incremental change in gas film thickness causes a relatively large change in the support force. Thus, in the system of FIG.

1 forces 18 and 13 are capable of change, whereas force 26 is not.

Assume that some external and momentary force displaces member 10 toward surface 13. As a result, force 18 is momentarily larger than force 30. In addition, force 30 is momentarily smaller than force 26. As a result of this imbalance between forces 26 and 30, piston 22 moves toward surface 13, such that forces 26 and 30 are again made equal. When the assumed momentary external force is removed, force 18 is operable to move member 10 away from surface 13 and back to its original spacing 11. This restoration movement causes force 30 to increase, and to be larger than force 26. As a result, piston 22 now moves away from surface 13, causing force 26 to again equal force 30. The system has now been restored to its original equilibrium condition.

If, for example, heating of member 10 causes it to expand, increasing the thickness between surfaces 19 and 90, this variation is accommodated by movement of piston 22 into cavity 24, and spacing 11 is not disturbed.

Figure 2:
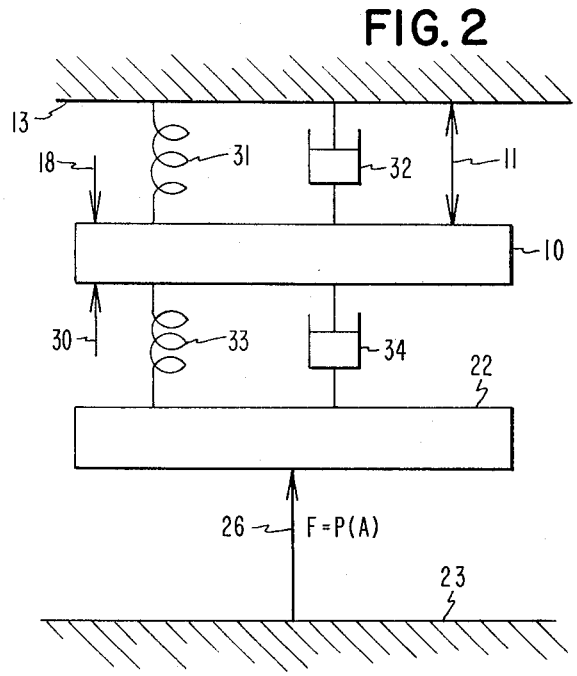
FIG. 2 shows the mathematical model of the gas bearing of FIG. 1.

FIG. 2 represents a mathematical model of the thrust gas bearing system of FIG. 1 and is helpful in understanding the operation thereof. In this mathematical model, the distance 11 may be, by way of example, in the range of 0.0001 to 0.002 inch. This bearing thickness is maintained by spring 31 and dashpot 32. Spring 31 represents a spring under compression and supplies force 18 against supported member 10. Spring 31 represents the spring effect of the gas bearing layer between member 10 and FIG. 1's bearing surface 13. Member 10 is subjected to an equal and opposite force 30, as provided by compression spring 33. Dashpots 32 and 34 represent the viscous gas damping effect of the gas bearing layers which support member 10. Block 22 represents FIG. 1's piston 22 and is movable by virtue of the action of force 26 extending between member 23 and the piston.

Figure 4:
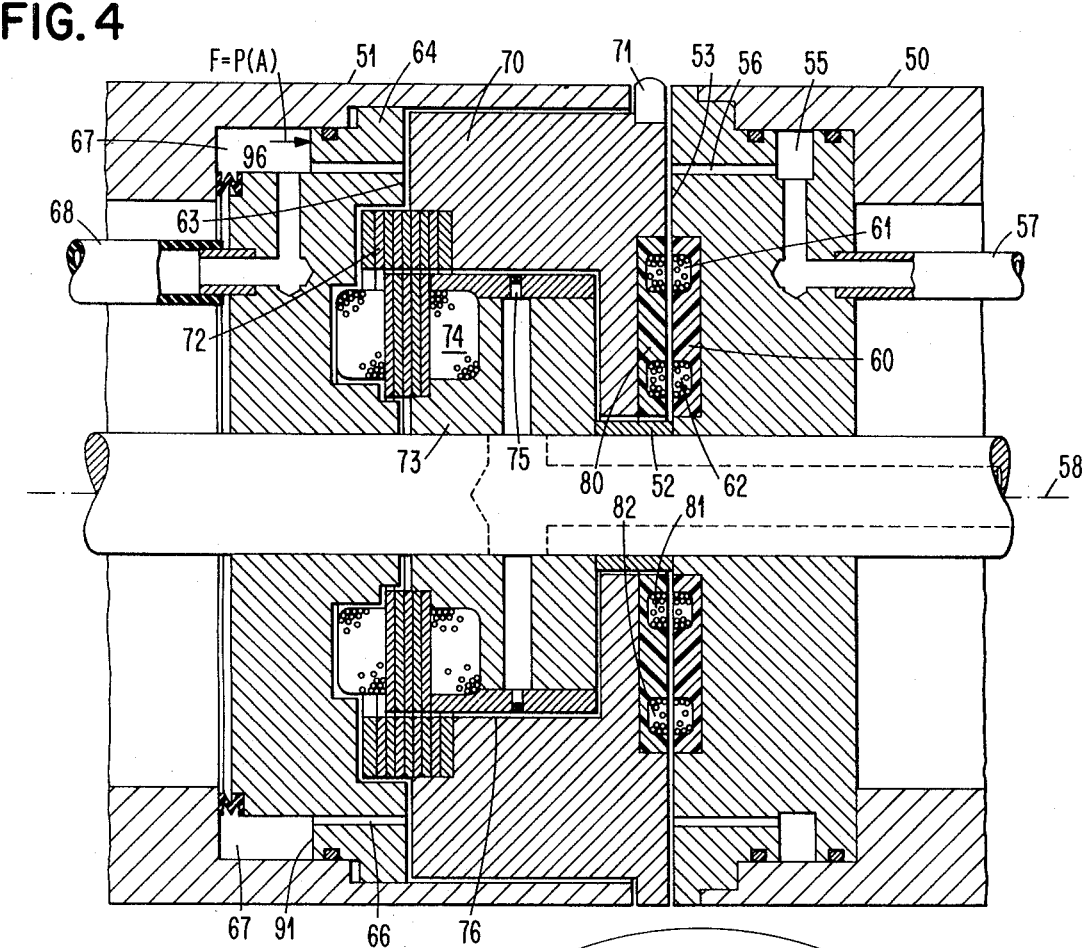
FIG. 4 shows, a rotating head assembly, as used in a magnetic tape recorder which is constructed in accordance with the present invention.

FIG. 4 shows a rotating magnetic head apparatus constructed in accordance with the present invention. Specifically, this apparatus is as described in co-pending application Ser. No. 350,303, now U.S. Pat. No. 3,823,415, filed Apr. 11, 1973 by G. A. Fisher et al., commonly assigned. Reference may be had to that application for a detailed explanation of this apparatus. Generally, this rotating head apparatus is for use in magnetic tape recording and/or reproduction wherein an annular head wheel or rotor is gas bearing supported both radially and in opposing axial direction. The rotor physically supports a magnetic head, a power transformer secondary winding, electronic amplifier means, a motor rotor, the movable member of a rotary signal transformer, and the movable member of an optical speed transducer. The rotor is movably positioned within an annular cavity formed by two mandrel halves. These mandrel halves are mounted in accurate end-to-end alignment at a joint site forming a portion of the cavity. The cavity walls include the motor stator, the stationary member of both the rotary signal transformer and the speed transducer, and hydrostatic air-blowing jets which supply the rotor-supporting air bearing. Thus, the annular rotor rotates with no physical engagement to the mandrel halves or the various means carried thereby.

In FIG. 4, the two cylindrical mandrel halves are identified by reference numerals 50 and 51, respectively. Mandrel half 50 is joined to mandrel half 51 by a joint site defined generally by an annular collar 52. Mandrel half 50 includes a disc-shaped radially extending wall 53 formed by stationary thrust reference plate 54. Reference plate 54 includes an annular cavity 55 which supplies a plurality of hydrostatic air bearing jets 56 from a source of air pressure, not shown, which is conected to conduit 57. The plurality of blowing air jets 56 are annularly located about the central axis 58 of the mandrel halves.

Wall 53 also includes stationary member 60 of a rotary transformer having two annular windings 61 and 62. The opposite radially extending cavity wall 63 is formed by axially movable thrust piston 64 which is carried by mandrel half 51. This mandrel half, in cooperation with piston 64, defines an annular pressurized cavity or plenum 67 which is operable to provide a constant axial force 96 operating against piston 64. The pressure within plenum 67 is also operable to supply air under pressure to a plurality of hydrostatic air bearing means 66. The plenum and the air bearing means are supplied with air by way of conduit 68. Conduit 68 is compliant or flexible to allow movement of piston 64.

Figure 5:
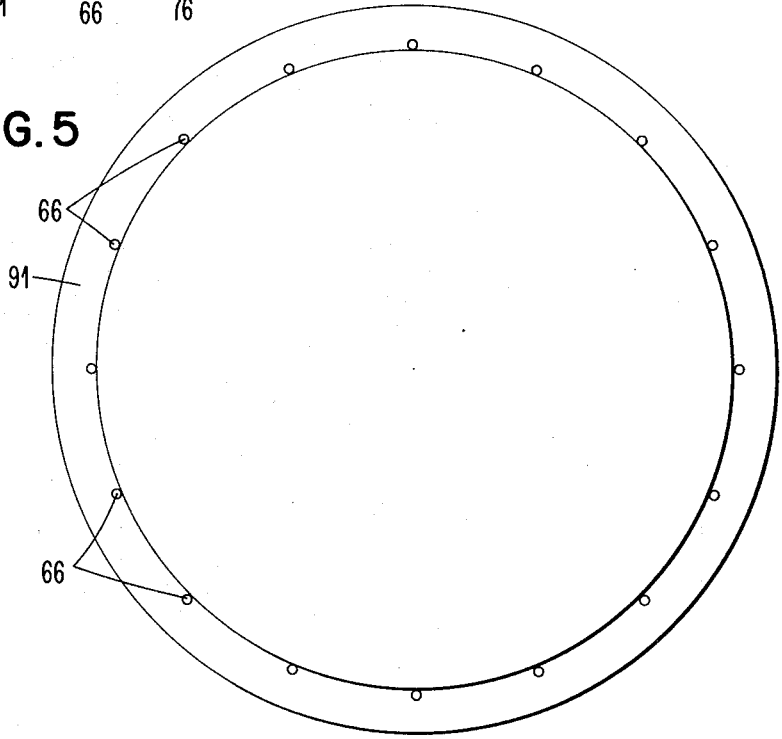
FIG. 5 shows the annular-shaped piston area associated with FIG. 4's axially movable thrust piston.

FIG. 5 shows the annular surface 91 of piston 64 which constitutes the area operated on by the pressure in annular cavity 67 to originate force 96. As shown in this figure, the annular pattern of air bearing means 66 may comprise sixteen individual hydrostatic bearings. Blowing air jets 56 may be of an identical configuration.

Reference numeral 70 identifies the annular head wheel which carries magnetic head 71 and motor rotor 72. A fixed position annular member 73 carries motor stator 74 and a plurality of radially extending hydrostatic air bearing means 75 located to form an annular pattern about the axially extending wall 76 of the head wheel's cavity. Head wheel 70 also carries a second transducing member 80 which cooperates with transducing member 60 and specifically carries the movable transformer windings 81 and 82 which cooperate in transducing relationship with stationary transformer windings 61 and 62, respectively.

As is well known to those of skill in the art, the spacial transducing. relationship between these transformer windings critically defines thee frequency response and frequency band width which can be supplied across this transducing interface. The use of the present thrust gas bearing establishes this spacial relationship closely and accurately since expected manufacturing tolerances result in movement in piston 64 and minimal variation in the spacing between the transformer secondary halves, as above described.

While the invention has been particularly shown and described with reference to a preferred embodiment thereof, it will be understood by those skilled in the art that various changes in form and details may be made therein without departing from the spirit and scope of the invention.

What is claimed is:

1. A rotating head apparatus, comprising:
first and second mandrel halves mounted in axial alignment and defining an annular cavity at the joint site thereof,
first annular rotary transformer means mounted at a fixed position in one radially extending wall of said cavity and concentric with the axis of said mandrel,
first annular hydrostatic gas bearing means mounted at a fixed position in said one cavity wall, an axially movable piston forming the opposite axially extending wall of said cavity, second annular hydrostatic gas bearing means carried by said piston in said opposite cavity wall, a pressurized plenum movably supporting said piston and supplying gas under pressure to said second bearing means, and an annular head wheel supported in said cavity by said gas bearing means and carrying second annular rotary transformer means on a surface thereof which confronts said first bearing means.

2. The rotating head apparatus defined in claim 1, including further gas bearing means carried by an axially extending wall of said cavity and operating to radially support said head wheel.

3. The rotating head apparatus defined in claim 2 wherein said first bearing means is supplied with gas under pressure calculated to establish a given bearing force against the adjacent wall of said head wheel with a known spacing between said first and second transformer means, wherein said plenum is supplied with gas under pressure calculated to establish said given bearing force against an opposite wall of said head wheel, and wherein said plenum pressure is additionally operative to axially move said piston to an operative position whereat said head wheel and its integral transformer means are spaced from said first bearing means by said known spacing.

4. Gas bearing supported headwheel recording apparatus comprising:

a fixed position gas bearing member supplying a gas under pressure to a bearing surface thereof, a first transducing element mounted on said bearing surface, a compliantly mounted and movable headwheel including a second transducing element mounted on a headwheel surface which is adjacent said bearing surface, said headwheel surface thereby being subjected to a gas bearing force originating from said fixed position gas bearing member, a fixed position gas pressurized plenum mounted on the opposite side of said headwheel from said fixed position gas bearing member, a movable piston mounted within said plenum, and subject to the pressure therein, and a movable gas bearing surface integrally carried by said piston and supplied with gas under pressure from said plenum, said movable gas bearing surface supplying a gas bearing force to said headwheel in a direction to oppose the force originating from said fixed position gas bearing member, whereby accurate mechanical spacing of said first and second transducing elements is maintained by movement of said piston and its integral gas bearing surface.

* * * * *